United States Patent
Wiggins et al.

(10) Patent No.: US 8,801,688 B2
(45) Date of Patent: Aug. 12, 2014

(54) NUTRITIVE SUBSTANCE DELIVERY CONTAINER

(75) Inventors: Robin P. Wiggins, Newburgh, IN (US); Rick Grelewicz, Mt. Vernon, IN (US); Nagendra Rangavajla, Newburgh, IN (US); Joshua C. Anthony, Evansville, IN (US); Patrick McCallister, Newburgh, IN (US)

(73) Assignee: Mead Johnson Nutrition Company, Glenview, IL (US)

( * ) Notice: Subject to any disclaimer, the term of this patent is extended or adjusted under 35 U.S.C. 154(b) by 739 days.

(21) Appl. No.: 12/250,588

(22) Filed: Oct. 14, 2008

(65) Prior Publication Data

US 2010/0089860 A1    Apr. 15, 2010

(51) Int. Cl.
| | |
|---|---|
| *B65D 1/02* | (2006.01) |
| *B65D 41/00* | (2006.01) |
| *B65D 83/68* | (2006.01) |
| *B65D 51/22* | (2006.01) |
| *B65D 51/28* | (2006.01) |
| *B65D 23/04* | (2006.01) |
| *B65D 81/32* | (2006.01) |

(52) U.S. Cl.
CPC ............ *B65D 83/685* (2013.01); *B65D 51/225* (2013.01); *B65D 51/28* (2013.01); *B65D 51/2807* (2013.01); *B65D 23/04* (2013.01); *B65D 81/32* (2013.01); *B65D 2251/0093* (2013.01); *B65D 2217/00* (2013.01); *B65D 2217/02* (2013.01); *A23V 2200/3204* (2013.01); *A23V 2200/32* (2013.01)
USPC ............ 604/414; 604/403; 604/415; 604/416

(58) Field of Classification Search
CPC .. B65D 51/28; B65D 51/2892; B65D 83/685; B65D 51/225; B65D 51/2807; B65D 2251/0093; B65D 2251/0025; B65D 23/04; B65D 81/32; B65D 2217/00; B65D 2217/02; A23V 2200/3204; A23V 2200/32
USPC ........ 604/78, 415, 416; 53/170, 48.1; 222/80, 222/129, 145.1, 541; 99/323, 232.2; 239/33, 34
See application file for complete search history.

(56) References Cited

U.S. PATENT DOCUMENTS

| 1,798,339 A | 3/1931 | Soulis |
| 1,889,111 A | 11/1932 | Serr |

(Continued)

FOREIGN PATENT DOCUMENTS

WO    WO 2006 088923 A2    8/2006

OTHER PUBLICATIONS

Gerald W. Tannock et al. Appl Environ Microbiol. Dec. 2005; 71(12): 8419-8425. doi: 10.1128/AEM.71.12.8419-8425.2005. Abstract accessed Friday, Jun. 17, 2011. http://www.ncbi.nlm.nih.gov/pmc/articles/PMC1317450.*

(Continued)

*Primary Examiner* — Adam Marcetich
(74) *Attorney, Agent, or Firm* — Waddey & Patterson, P.C.; James R. Cartiglia

(57) ABSTRACT

The invention comprises a novel apparatus for delivering a nutritive substance comprising a container body having a base at one end thereof, an upper portion adapted for removable receipt of a closure, the upper portion defining an opening therein, and a chamber defined by the container body, the chamber being in fluid communication with the upper portion opening. A seal is bonded across the upper portion opening of the container and is adapted to provide an airtight seal across the opening. A closure is removably coupled to the container upper portion. A nutritive substance is coated onto an element selected from the group consisting of an inner surface of the container upper portion, the closure, an insert positioned above the seal, and combinations thereof. The seal prevents contact between the nutritive substance and the contents of the container until the seal is removed or pierced.

10 Claims, 9 Drawing Sheets

(56) References Cited

U.S. PATENT DOCUMENTS

| | | | |
|---|---|---|---|
| 2,631,521 A | 3/1953 | Atkins, Jr. | |
| 2,642,870 A | 6/1953 | Smith | |
| 2,824,010 A * | 2/1958 | Pedersen | 426/120 |
| 3,321,097 A * | 5/1967 | Solowey | 206/221 |
| 3,347,410 A | 10/1967 | Schwartzman | |
| 3,407,922 A | 10/1968 | Palmer | |
| 3,603,469 A | 9/1971 | Magni | |
| 3,613,955 A | 10/1971 | Wetherell, Jr. | |
| 3,779,372 A | 12/1973 | De Lloret | |
| 3,840,136 A | 10/1974 | Lanfranconi et al. | |
| 3,968,872 A * | 7/1976 | Cavazza | 206/222 |
| 4,177,938 A | 12/1979 | Brina | |
| 4,221,291 A | 9/1980 | Hunt | |
| 4,264,007 A * | 4/1981 | Hunt | 206/219 |
| 4,682,702 A | 7/1987 | Gach | |
| 4,819,819 A * | 4/1989 | Robertson, Jr. | 215/230 |
| 4,948,015 A * | 8/1990 | Kawajiri et al. | 222/107 |
| 5,029,718 A | 7/1991 | Rizzardi | |
| 5,082,136 A | 1/1992 | Schumann | |
| 5,121,845 A * | 6/1992 | Blanchard | 215/232 |
| 5,290,574 A | 3/1994 | Jamieson et al. | |
| 5,298,248 A * | 3/1994 | Hugues et al. | 424/400 |
| 5,584,388 A | 12/1996 | Johnson | |
| 5,707,353 A | 1/1998 | Mazer et al. | |
| 5,738,651 A | 4/1998 | Walton et al. | |
| 5,755,360 A * | 5/1998 | Elliott | 222/153.07 |
| 5,782,345 A * | 7/1998 | Guasch et al. | 206/222 |
| 5,915,578 A * | 6/1999 | Burt | 215/250 |
| 5,921,955 A | 7/1999 | Mazer et al. | |
| 5,927,549 A | 7/1999 | Wood | |
| 5,980,959 A | 11/1999 | Frutin | |
| 6,024,012 A * | 2/2000 | Luzenberg, Jr. | 99/323 |
| 6,036,669 A | 3/2000 | Cole et al. | |
| 6,059,443 A * | 5/2000 | Casey | 366/130 |
| 6,080,132 A | 6/2000 | Cole et al. | |
| 6,098,795 A | 8/2000 | Mollstam et al. | |
| 6,105,760 A * | 8/2000 | Mollstam et al. | 206/222 |
| 6,138,821 A | 10/2000 | Hsu | |
| 6,152,296 A | 11/2000 | Shih | |
| 6,170,654 B1 | 1/2001 | Gartner et al. | |
| 6,209,718 B1 * | 4/2001 | Mollstam et al. | 206/222 |
| 6,230,884 B1 * | 5/2001 | Coory | 206/222 |
| 6,251,432 B1 | 6/2001 | Mazer et al. | |
| 6,277,092 B1 | 8/2001 | Cole et al. | |
| 6,283,294 B1 * | 9/2001 | Thorball et al. | 206/438 |
| 6,302,288 B1 * | 10/2001 | Nava et al. | 220/212 |
| 6,336,912 B1 | 1/2002 | Bourguignon | |
| 6,482,451 B1 | 11/2002 | Baron | |
| 6,513,650 B2 | 2/2003 | Mollstam et al. | |
| 6,541,055 B1 | 4/2003 | Luzenberg | |
| 6,561,232 B1 | 5/2003 | Frutin | |
| 6,702,161 B2 * | 3/2004 | Adams et al. | 222/521 |
| 6,854,595 B2 | 2/2005 | Kiser | |
| 6,926,138 B1 * | 8/2005 | Basham et al. | 206/222 |
| 7,175,049 B2 | 2/2007 | Kastenschmidt et al. | |
| 7,279,187 B2 * | 10/2007 | Daniels et al. | 426/74 |
| 7,413,097 B1 * | 8/2008 | Adams | 220/268 |
| 7,503,453 B2 * | 3/2009 | Cronin et al. | 206/221 |
| 7,506,782 B2 * | 3/2009 | Walters et al. | 222/83 |
| 7,823,723 B2 * | 11/2010 | Anthony et al. | 206/222 |
| 7,828,140 B2 * | 11/2010 | Lee et al. | 206/222 |
| 2002/0040856 A1 * | 4/2002 | Mollstam et al. | 206/222 |
| 2002/0096440 A1 | 7/2002 | Kasuya | |
| 2002/0121454 A1 | 9/2002 | Ross | |
| 2002/0157970 A1 | 10/2002 | Carlson | |
| 2002/0179461 A1 | 12/2002 | Mollstam et al. | |
| 2002/0189956 A1 * | 12/2002 | Schoo et al. | 206/219 |
| 2003/0006159 A1 * | 1/2003 | Thorball et al. | 206/438 |
| 2003/0152629 A1 | 8/2003 | Shefer et al. | |
| 2004/0020797 A1 * | 2/2004 | Fontana | 206/219 |
| 2004/0050865 A1 | 3/2004 | Lizerbram et al. | |
| 2004/0226835 A1 | 11/2004 | Takahashi et al. | |
| 2005/0040052 A1 | 2/2005 | Dixon | |
| 2005/0133427 A1 | 6/2005 | Rinker et al. | |
| 2005/0153018 A1 * | 7/2005 | Ubbink et al. | 426/61 |
| 2005/0161348 A1 | 7/2005 | Morini | |
| 2006/0040019 A1 * | 2/2006 | Cecere | 426/85 |
| 2006/0118435 A1 * | 6/2006 | Cronin et al. | 206/219 |
| 2006/0141097 A1 * | 6/2006 | Guo | 426/61 |
| 2006/0193951 A1 | 8/2006 | Chen et al. | |
| 2007/0023300 A1 | 2/2007 | Spector et al. | |
| 2007/0029214 A1 | 2/2007 | Balazik | |
| 2007/0045134 A1 * | 3/2007 | Dvorak et al. | 206/222 |
| 2007/0215496 A1 * | 9/2007 | Scarborough | 206/222 |
| 2007/0246379 A1 | 10/2007 | Kuenzel | |
| 2007/0278114 A1 | 12/2007 | Kane et al. | |
| 2008/0023349 A1 * | 1/2008 | Balazik | 206/222 |
| 2008/0099487 A1 * | 5/2008 | Winn | 220/522 |
| 2008/0116086 A1 * | 5/2008 | Hung | 206/222 |
| 2008/0202951 A1 | 8/2008 | Landolt et al. | |
| 2010/0163439 A1 * | 7/2010 | Gutierrez Avendano | 206/219 |
| 2010/0221389 A1 * | 9/2010 | Frenken et al. | 426/74 |

OTHER PUBLICATIONS

Define Bonded at Dictionary.com. http://dictionary.reference.com/browse/bonded?r=66. Accessed Sep. 5, 2013.*
U.S Appl. No. 12/250,593, filed Oct. 14, 2008, Wiggins et al.
U.S. Appl. No. 12/250,585, filed Oct. 14, 2008, Wiggins et al.
IKI Literature Services—Search Results—Search Topic: *Delivery of a supplemental substance from a drink container*, p. 1-104.
Goldfire Innovator—*MOI—LGG Delivery for Shelf-Stable Convenient Packages*, Ron Stoner, Principal Information Scientist, Mead Johnson Nutritionals.

* cited by examiner

NUTRITIVE SUBSTANCE DELIVERY CONTAINER

CROSS-REFERENCE TO RELATED PATENT APPLICATIONS

U.S. patent applications entitled 'Nutritive Substance Delivery Container' filed concurrently herewith and having Ser. Nos. 12/250,585 and 12/250,593, respectively, are related hereto, and the details of each of these applications are incorporated herein by reference.

FIELD OF THE INVENTION

The present invention relates generally to the field of container constructions.

BACKGROUND OF THE INVENTION

Many nutritive substances which would be beneficial if included in food or drink products are sensitive to heat, light, oxygen, and/or moisture. For example, a nutritive substance which is sensitive to heat cannot be added to a food or drink product that requires heat sterilization because the high sterilization temperatures may damage or destroy the nutritive substance. As a result of these limitations, containers have been developed that can separate the nutritive substance from the food or drink product prior to consumption. The user can then dispense the nutritive substances into the food or drink product just before consumption. The present invention, therefore, relates to a container which can separately contain a nutritive substance and a food or drink product and deliver the nutritive substance to the food or drink product just before consumption.

SUMMARY OF THE INVENTION

In an embodiment, the invention comprises a novel apparatus for delivering a nutritive substance comprising a container body having a base at one end thereof, an upper portion adapted for removable receipt of a closure, the upper portion defining an opening therein, and a chamber defined by the container body, the chamber being in fluid communication with the upper portion opening. A seal is bonded across the upper portion opening of the container and is adapted to provide an airtight seal across the opening. A closure is removably coupled to the container upper portion. A nutritive substance is coated onto an element selected from the group consisting of an inner surface of the container upper portion, the closure, an insert positioned above the seal, and combinations thereof. The seal prevents contact between the nutritive substance and the contents of the container until the seal is removed or pierced.

In another embodiment, the invention comprises an apparatus for delivering a nutritive substance comprising a container body having a base at one end thereof, an upper portion adapted for removable receipt of a closure, the upper portion defining an opening therein, and a chamber defined by the container body. The chamber is in fluid communication with the upper portion opening. The invention additionally comprises a seal bonded across the upper portion opening, which is adapted to provide an airtight seal across the opening. The invention also comprises a closure removably coupled to the upper portion, the closure comprising an annular cap having a vertical side wall and a top surface coupled to said side wall, wherein the top surface is adapted to allow the contents of said container to pass therethrough. Additionally, the invention comprises a nutritive substance coated onto an insert positioned intermediate the seal and top surface, wherein the seal prevents contact between the nutritive substance and the contents of the container until the seal is removed or pierced.

In a separate embodiment, the invention comprises a method for making a delivery apparatus, the method comprising the steps of providing a container body having a base at one end thereof, an upper portion at the other end of said body, wherein said upper portion is adapted for removable receipt of a closure, said upper portion defining an opening therein, a chamber defined by said container body, said chamber being in fluid communication with said body upper portion opening, and a closure adapted to be removably received on said upper portion; filling said container with a product; sterilizing the product-filled container; sealing said container upper portion with a seal; coating a nutritive substance onto an element selected from the group consisting of an inner surface of said container upper portion, said closure, an insert positioned above said seal, and combinations thereof; and placing said closure on said body upper portion.

BRIEF DESCRIPTION OF THE DRAWINGS

A full and enabling disclosure of the present invention, including the best mode thereof directed to one of ordinary skill in the art, is set forth in the specification, which refers to the appended figures, in which.

Figure 1:
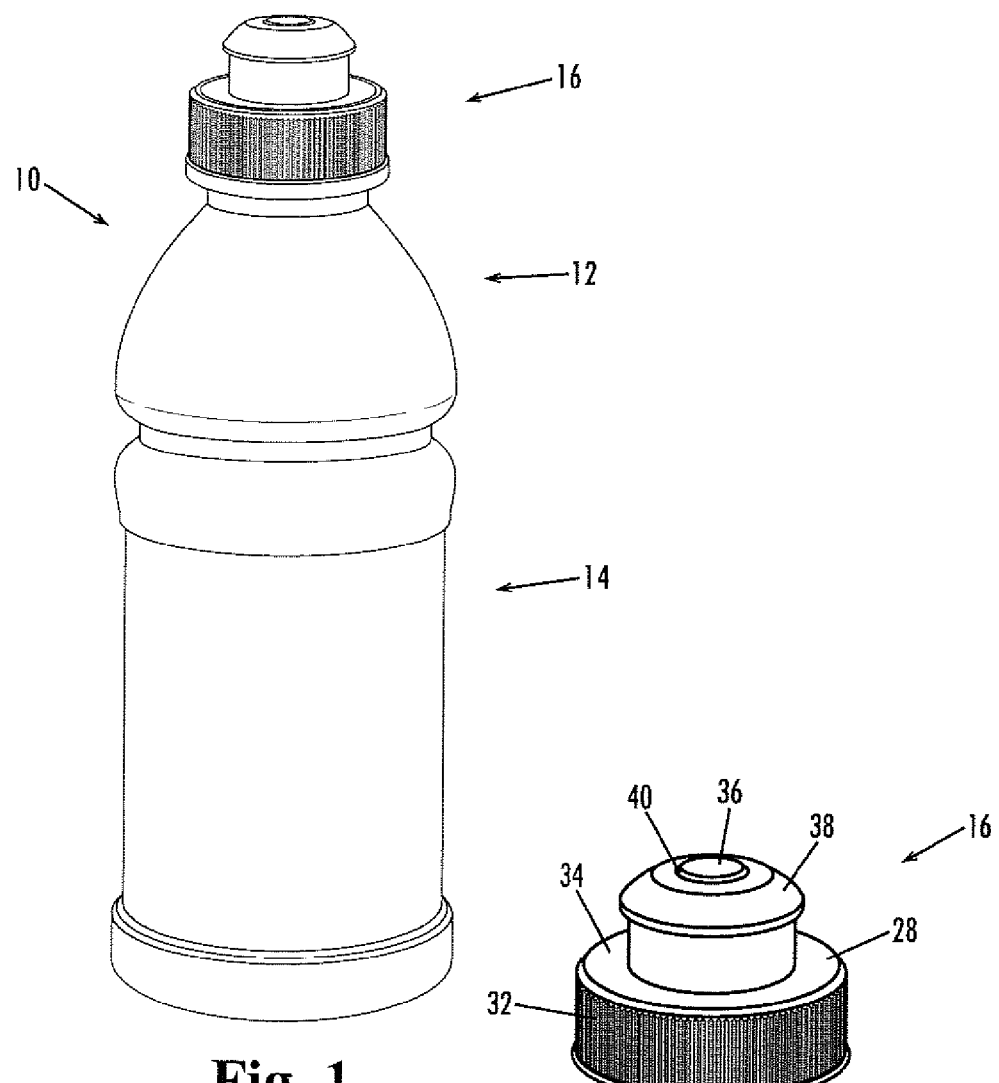
FIG. 1 is a perspective view of a container in accordance with one embodiment of the present invention.

Repeat use of reference characters in the present specification and drawings is intended to represent same or analogous features or elements of the invention.

DETAILED DESCRIPTION OF THE INVENTION

One of ordinary skill in the art will understand that the present discussion is a description of exemplary embodiments only, and is not intended as limiting the broader aspects of the present invention, which broader aspects are embodied in the exemplary construction. A repeat use of reference characters in the present specification and drawings represents the same or analogous features or elements of the invention.

As set forth above, the present invention relates generally to the field of container constructions. References related to container constructions may include U.S. Pat. Nos. 5,707,353 and 5,921,955 to Mazer, et al. and U.S. Pat. No. 6,098,795 to Mollstam, et al.

The technical problem to be solved by the present invention is to provide novel containers that are useful in delivering a nutritive substance to the contents of a container just before consumption of the contents. Thus, in an embodiment, the present invention is directed to a container having a nutritive substance disposed between at least two layers of a laminate seal. Before consumption of the contents of the container, the laminate seal may be pierced or altered such that the nutritive substance is released into the contents of the container. In other embodiments, the nutritive substance may be present on an insert or may be coated onto the interior of the container such that it does not contact the contents of the container until the container is altered by the consumer just before consumption.

Figure 2:
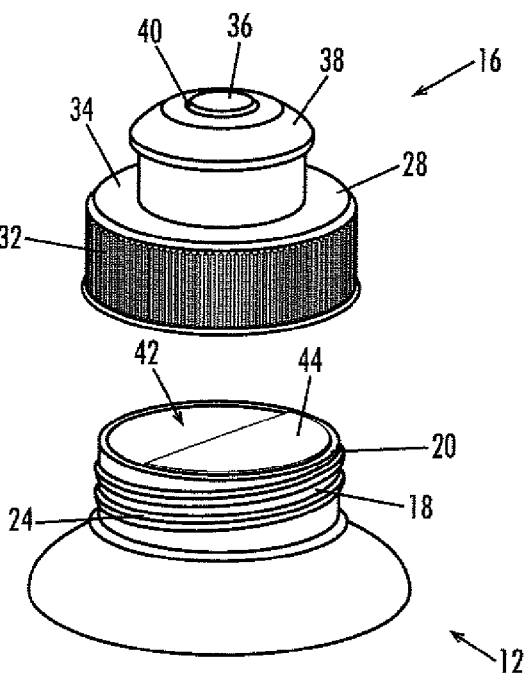
FIG. 2 is a partial perspective view of the container top illustrated in FIG. 1.

With reference now to the drawings, and in particular to FIGS. 1 and 2, an embodiment of the container 10 having a cylindrical top portion 12, a body portion 14, and a closure 16 is shown. Cylindrical top portion 12 and body 14 may be integrally molded of a suitable polymer material, which may be blow molded, by extrusion or injection, so that it is a unitary member of uniform wall thickness. Suitable polymers for forming the container include, but are not limited to, polystyrene, polystyrene-acrylonitile, acrylonitile-butadiene-styrene, styrene-maleicanhydride, polycarbonate, polyethylene terephthalate, polyvinylcyclohexane, and blends thereof.

Referring particularly to FIG. 2, in some embodiments, cylindrical top portion 12 includes a threaded cylindrical portion 18. Threaded cylindrical portion 18 may have a rim 20 formed at one end thereof that defines an aperture 22 (shown in FIG. 4) that is in fluid communication with an inner chamber (not shown) of body 14. A helical thread 24 may be integrally formed on an outer surface of threaded cylindrical portion 18 for threadably receiving closure 16. Helical thread 24 may begin proximate to rim 20 and may terminate proximate a flange 26 (shown in FIG. 4).

In an embodiment, closure 16 includes an annular cap 28 having a helical thread (not shown) on its inner circumference for operatively engaging threaded cylindrical top portion 18. The outer circumference of annular cap 28 may contain ribs or knurling 32 to allow the user to more easily grip closure 16 to remove it from, or fit it on, top portion 12. In addition to its internally threaded cylindrical wall, cap 28 may include an annular end wall 34 having an extension 36 defining a though hole (not shown) therein. A second annular enclosure 38, having an opening 40 formed therein, may be operatively secured to annular end wall extension 36 so that second annular enclosure 38 is moveable between a first position where second annular enclosure 38 prevents the contents of the container from flowing through opening 40 and a second position where the contents of the container are able to flow through opening 40. It should be understood that closure 16 may be formed from any type of closure known in the art.

Figure 3:
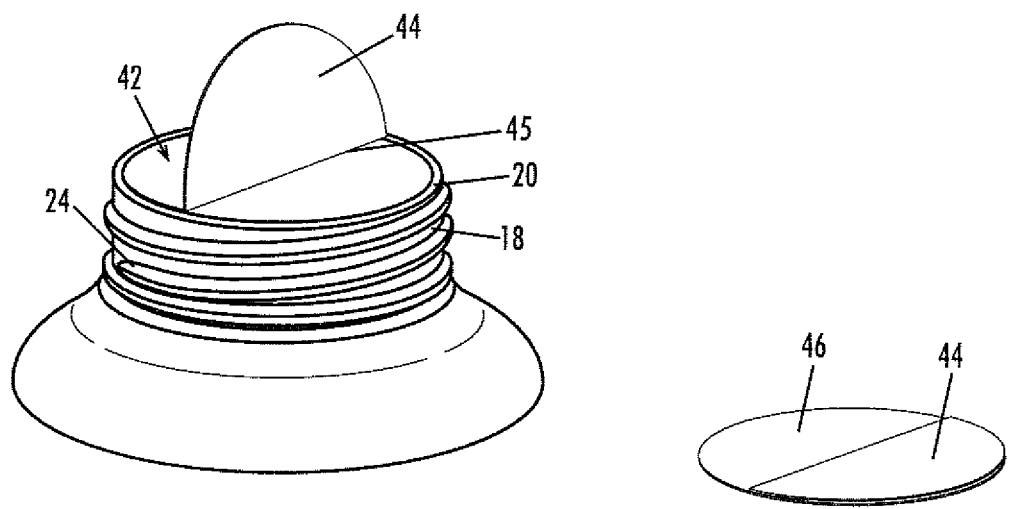
FIG. 3 is a partial perspective view of the container top illustrated in FIG. 1.
Figure 4:
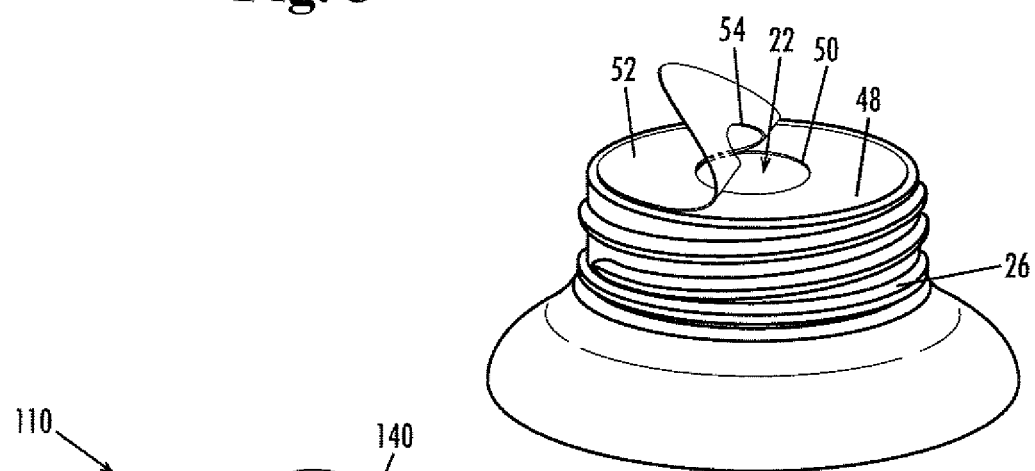
FIG. 4 is a partial perspective view of the container top illustrated in FIG. 1.

With reference to FIGS. 2 and 3, a releasable seal 42 may be attached to rim 20 over aperture 22 (FIG. 4). In some embodiments, releasable seal 42 contains a semicircular tab 44 attached across the center of releasable seal 42 along a line 45 (FIG. 3). Tab 44 may be formed from the same material as releasable seal 42 or may be formed of, or coated with, a different material to increase gripability of the tab. Referring to FIG. 4, releasable seal 42 may be a laminate having at least three layers. In an embodiment, the laminate comprises a first layer 46, a second layer 48, and a third layer 52. The first layer 46 may comprise a tab 44, which may be bonded or integrally formed therewith. The second layer 48 may define at least one hole 50 therethrough. The third layer 52 may define at least one hole 54 therethrough as well. The third layer 52 may comprise a nutritive substance bonded to at least one of layers 46 and 48. In some embodiments, the third layer 52 may be disposed between layers 46 and 48. In this embodiment, the third layer is centrally-positioned between layers 46 and 48. In a certain embodiment, the third layer 52 may be disposed on a top side of second layer 48. In this configuration, nutritive substance layer 52 is sealed between first and second seal layers 46 and 48 so as to prevent the nutritive substance from contacting the contents of the container and/or the atmosphere before removal of first layer 46.

Second layer 48 may be permanently bonded to rim 20, while first layer 46 may be releasably bonded to rim 20, second layer 48, or third layer 52 so that when first layer 46 is removed, second layer 48 and third layer 52 remain bonded to rim 20 (shown in FIG. 3). One skilled in the art should be familiar with such releasably attached seals. Specifically, adhesive or heat attaches a seal formed of polyvinyl chloride, polystyrene, or other suitable material to rim 20 to form an airtight seal.

In a particular embodiment, first layer 46 is releasably bonded to second layer 48 such that third layer 52, disposed between first layer 46 and second layer 48, cannot contact the container content until first layer 46 is removed. In this embodiment, the second layer hole 50 may be slightly smaller than the third layer hole 54. This configuration allows first layer 46 to bond directly to second layer 48 at the rim of the container and at the hole 50, sealing third layer 52 between the first and second layers.

Referring to FIGS. 2-4, in use, a consumer may remove closure 16 to reveal releasable seal 42. Removal of closure 16 will not disturb the seal unless the seal is cut or removed by the consumer. In this arrangement, the nutritive substance layer 52 may be protected from exposure to the atmosphere by releasable seal first layer 46 and from the contents of the container 14 by releasable seal second layer 48. When the consumer is ready to consume the contents of the container, tab 44 may be gripped and pulled away from rim 20 causing the bond to fail between releasable seal first and second layers 46 and 48 and exposing nutritive substance layer 52 to the atmosphere. When the first seal layer 46 is removed, the second seal layer 48 maintains its bond with rim 20. Once the first seal layer 46 is removed, closure 16 may be replaced on threaded cylindrical portion 18 thereby resealing the container. When closure 16 is replaced onto the container, each time the consumer inverts the container, the contents of the container flow from the container through aperture 22, hole 50, and hole 54, into contact with nutritive substance layer 52, providing a gradual release of the nutritive substance prior to or during consumption.

In other embodiments, releasable seal 42 comprises two layers: a first layer 46 and a second layer 48. The first layer may comprise a tab 44 which may be bonded or integrally formed therewith. The second layer 48 may define at least one hole 50 therethrough. A nutritive substance may be bonded to the upper side of second layer 48, disposed between first layer 46 and second layer 48. Second layer 48 may be permanently bonded to rim 20, while first layer 46 may be releasably bonded to second layer 48 so that when first layer 46 is removed, second layer 48 remains bonded to rim 20. In use, tab 44 may be gripped and pulled away from rim 20 causing the bond to fail between releasable seal first and second layers 46 and 48 and exposing nutritive substance to the atmosphere. Closure 16 may then be replaced on threaded cylindrical portion 18 thereby resealing the container. When closure 16 replaced onto the container, each time the consumer inverts the container, the contents of the container flow from the container through aperture 22 and hole 50 into contact with the nutritive substance, providing a gradual release of the nutritive substance prior to or during consumption.

Figure 5:
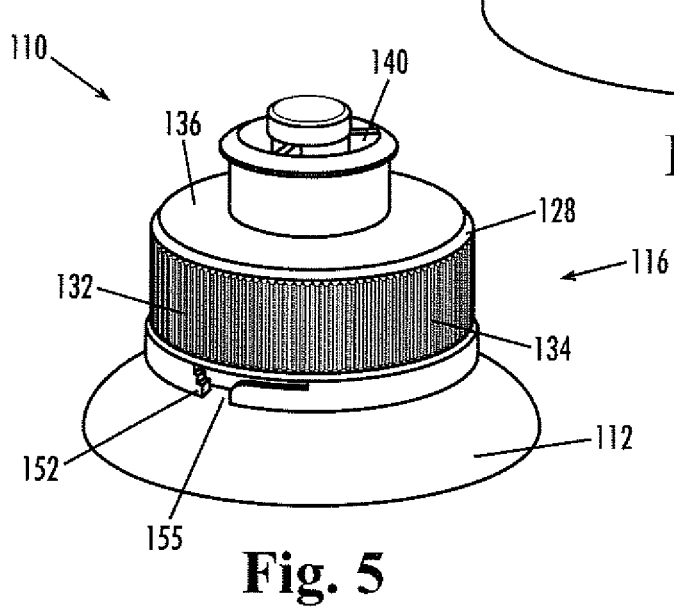
FIG. 5 is a perspective view of a container top in accordance with one embodiment of the present invention.
Figure 6:
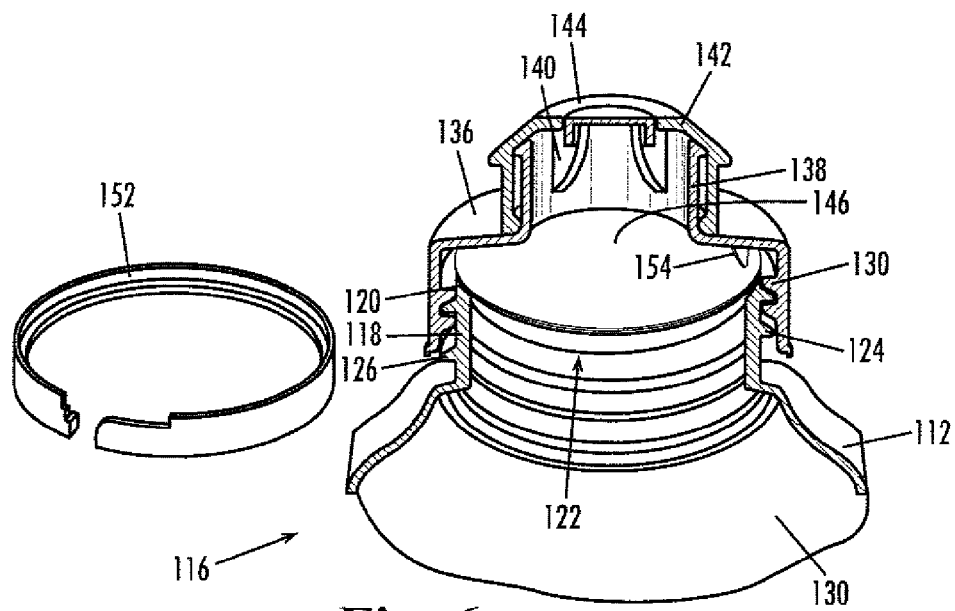
FIG. 6 is a perspective cut-away view of the container top illustrated in FIG. 5.

Referring to FIGS. 5 and 6, in another embodiment, container 110 includes a cylindrical top portion 112, a body portion (not shown but similar to that shown in FIG. 1), and a closure 116. Cylindrical top portion 112 and the body portion may be integrally molded of a suitable polymer material, which may be blow molded, by extrusion or injection, so that it is a unitary member of uniform wall thickness. Suitable polymers for forming the container include, but are not limited to, polystyrene, polystyrene-acrylonitrile, acrylonitile-butadiene-styrene, styrene-maleicanhydride, polycarbonate, polyethylene terephthalate, polyvinylcyclohexane, and blends thereof.

Referring particularly to FIG. 6, cylindrical top portion 112 may include a threaded cylindrical portion 118 that defines a rim 120 at one end thereof. Rim 120 may define an aperture 122 in fluid communication with an inner chamber 130 defined by cylindrical top portion 112. Cylindrical top portion 118 may be adapted for the removable receipt of closure 116 by a helical thread 124, which may be integrally formed on threaded cylindrical portion 118. Helical thread 124 may begin proximate to rim 120 and may terminate proximate a flange 126.

In some embodiments, closure 116 includes an annular cap 128 (FIG. 5) having a helical thread 130 on its inner circumference (FIG. 6) for removably securing cap 128 to the externally threaded cylindrical top portion 118. Outer circumference 132 of annular cap 128 may contain ribs or knurling 134 (FIG. 5) to allow the user to more easily grip closure 116 to remove it from, or fit it on, top portion 112. In addition to its internally threaded cylindrical wall, cap 128 may include an annular end wall 136 having an extension 138 (shown in FIG. 6) defining a though hole 140 (FIG. 5) therein. A second annular enclosure 142, having an opening 144 therein, may be operatively secured to annular end wall extension 138 so that second annular enclosure 142 is moveable between a first position where second closure 142 prevents the contents of the container from flowing through opening 140, and a second position where the contents of the container are able to flow through opening 140. A cutting portion, or blade 154, may extend axially downward from the under surface of annular end wall 136 proximate rim 120. It should be understood that closure 116 may be formed from any type of suitable closure known in the art.

Figure 6A:
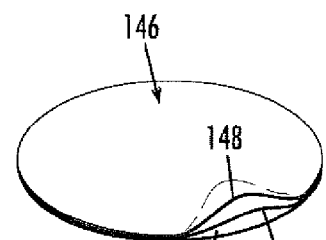
FIG. 6A is a plan view of a seal for use in the container of FIG. 5.

With reference to FIG. 6, a releasable seal 146 may be attached to rim 120 over aperture 122. Referring to FIG. 6A, releasable seal 146 may be formed from a laminate having at least three layers. In some embodiments, the laminate comprises a nutritive substance layer 150 between an upper layer 148 and a lower layer 149. It should be understood that the nutritive substance layer 150 may be disposed between the upper layer 148 and the lower layer 149. In other embodiments, releasable seal 146 comprises two layers: an upper layer 148 and a lower layer 149. A nutritive substance may be bonded to the top side of lower layer 149 or the bottom side of upper layer 148. In either of these arrangements, releasable seal 146 may be permanently bonded to rim 120. Therefore, removal of closure 16 will not disturb the seal unless the seal is cut or removed. One of skill in the art should understand that the structure of this seal may be used with any of the embodiments described herein.

Referring to FIGS. 5 and 6, a tear band 152 may retain closure 116 on cylindrical top portion 112 in a raised position (FIG. 5) so that blade 154 does not engage releasable seal 146. That is, when tear band 152 is in place (FIG. 5), the tear band blocks further tightening of closure 116 so that blade 154 cannot engage seal 146. The tear band also acts as an anti-tamper band to prevent the closure from being removed prior to purchase by a consumer. The tear band may be connected to the bottom edge of annular cap 128 in many ways. For example, tear band 152 may be integrally formed with annular cap 128 with a gap 155 formed therein to allow a consumer to tear the band away from the cap. In other embodiments, tear band 152 may connect to a lower edge of annular cap 128 by a plurality of relatively thin and frangible breakaway tongues or webs (not shown). An internally, radially inwardly projecting and angularly extending ridge(s) (not shown) may be formed on an inner circumference of tear band 152, which engages an under surface flange 126. Thus, tensile forces rotationally fix the tear band to the flange as annular closure 116 is unthreaded off the container. As the annular closure is rotationally removed, both tensile and torsional forces acting on the webs cause the webs to sever allowing closure 116 to be completely removed. If closure 116 is removed, releasable seal 146 is maintained, thereby protecting the contents of the container and the nutritive substance from exposure to the atmosphere and each other.

Figure 7:
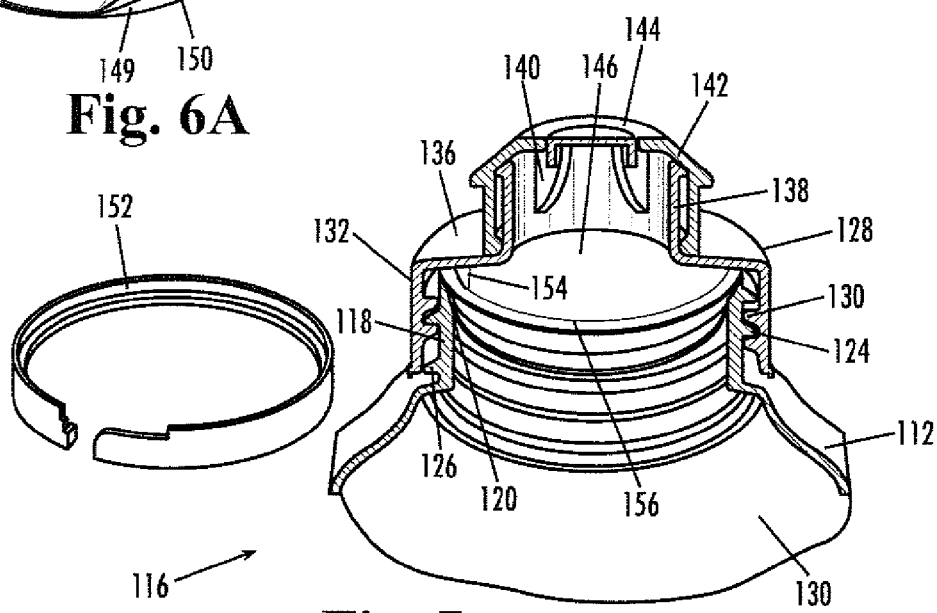
FIG. 7 is a perspective cut-away view of the container top illustrated in FIG. 5.

Referring to FIGS. 6 and 7, in use, a consumer may remove tear band 152 (FIG. 6) and rotate closure 116 clockwise (with respect to FIG. 6). As closure 116 turns, blade 154 is drawn downward into contact with releasable seal 146, which causes blade 154 to cut the seal. Continued rotation (FIG. 7) of closure 116 in the clockwise direction causes blade 154 to cut an arc 156 through the releasable seal adjacent to rim 120, thereby exposing the nutritive substance layer to the atmosphere and the contents of the container. When tear band 152 is attached, blade 154 may be positioned adjacent to releasable seal 146 so that a minimum number of revolutions are necessary to cut releasable seal 146. In this configuration, when closure 116 is in its rotated position, each time the consumer inverts the container, the contents of the container flow from the container through aperture 122 into contact with the nutritive substance layer, which provides a gradual release of the nutritive substance during consumption of the product.

It should be understood that a tear band is not required in this embodiment. Any device which prevents blade 154 from contacting releasable seal 146 until just before consumption of the product may be utilized in this embodiment.

Figure 8:
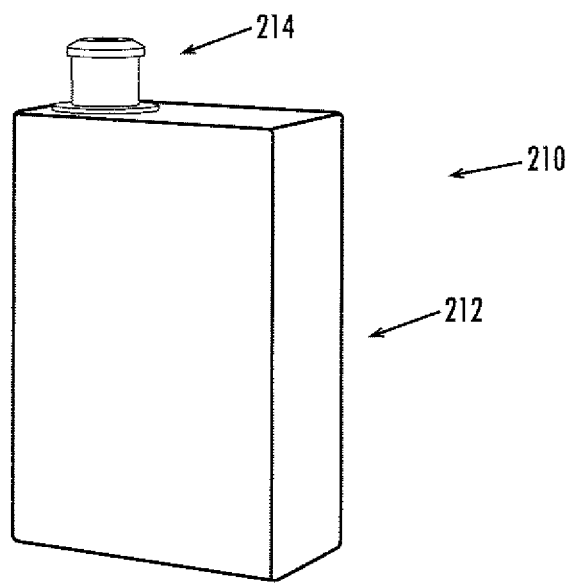
FIG. 8 is a perspective view of a container in accordance with one embodiment of the present invention.

Referring to FIG. 8, in yet another embodiment, an exemplary container 210 includes a generally rectangular body 212 and a closure 214. The container body in this embodiment need not be rectangular and may any suitable shape. Suitable polymers for forming the container include, but are not limited to, polystyrene, polystyrene-acrylonitrile, acrylonitilebutadiene-styrene, styrene-maleicanhydride, polycarbonate, polyethylene terephthalate, polyvinylcyclohexane, and blends thereof. Body 212 may contain an opening 244 (FIG. 11) formed on a top surface over which closure 214 is bonded.

Figure 9:
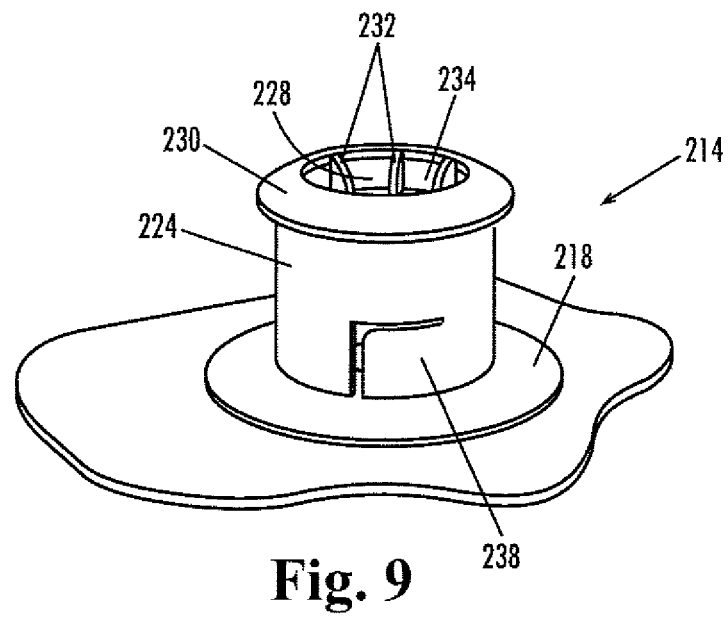
FIG. 9 is a partial perspective view of the container top illustrated in FIG. 8.
Figure 10:
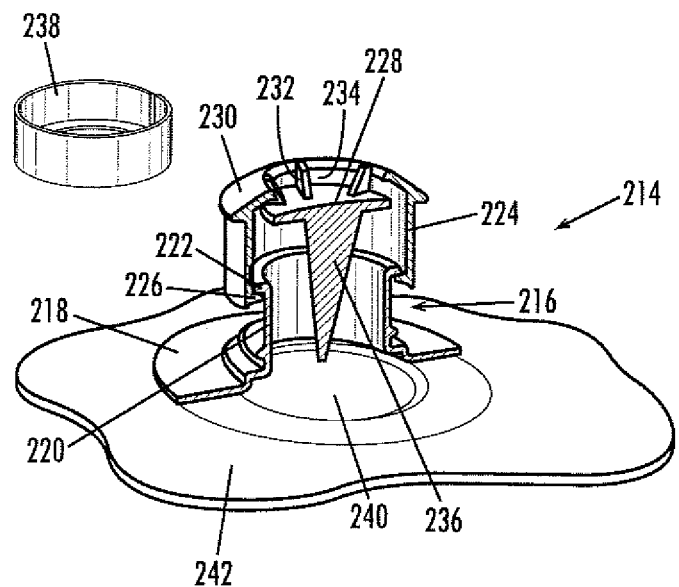
FIG. 10 is a partial perspective cut-away view of the container top illustrated in FIG. 8.

In the embodiment shown in FIGS. 9 and 10, closure 214 has a body 216 with a base 218 formed at one end of a vertical wall 220 and a flange 222 formed at the other end. An annular cap 224 may be received by vertical wall 220 and define an inwardly pointing flange 226 that cooperates with vertical wall flange 222. Annular cap 224 may include a top surface 228 that connects to a shoulder 230 by a plurality of ribs 232. A plurality of holes 234 may be defined between ribs 232. Annular cap top surface 228 may define a downward pointing cuffing portion, or spike 236, which may be formed by a flat body or may include multiple ribs or spikes positioned transverse to one another. A tear band 238 (FIG. 9) may connect to a bottom edge of annular cap 224 to maintain annular cap 224 in an extended position relative to body 216. In other words, tear band 238 may prevent annular cap 224 from being pressed downward with respect to vertical wall 220.

Figure 11:
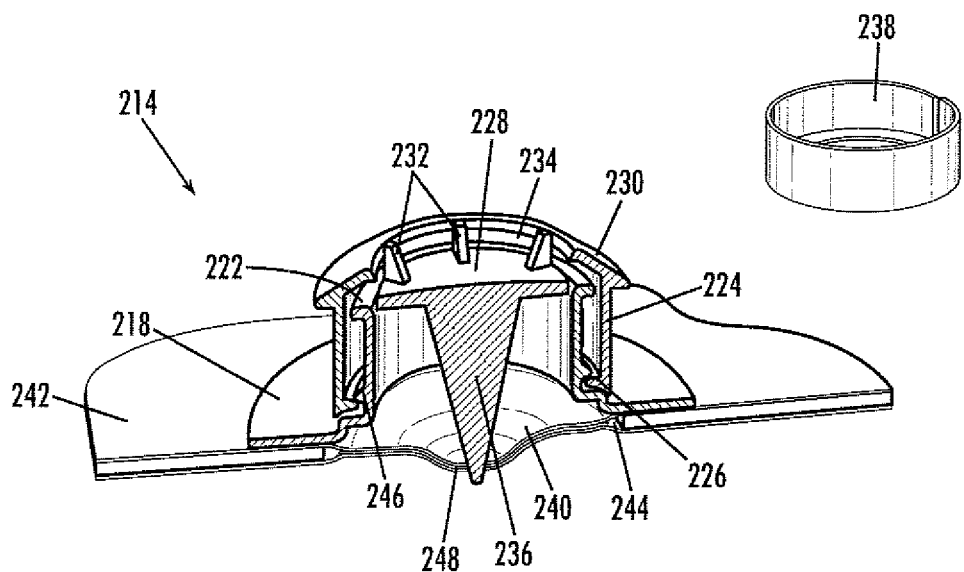
FIG. 11 is a partial perspective cut-away view of the container top illustrated in FIG. 8.

With reference to FIG. 10, a seal 240 may be bonded to a top surface 242 of container 212 to seal off opening 244 (FIG. 11). Seal 240 may be a laminate having at least three layers, one of which is a nutritive substance layer. In some embodiments, the nutritive substance layer is located between a first and second laminate layer. In other embodiments, seal 240 may be a laminate having two layers and a nutritive substance bonded to the top side of the lower layer or the bottom side of the upper layer, such that the nutritive substance is disposed between the upper and lower layers.

Referring to FIG. 11, in use, a consumer may remove tear band 238 (FIG. 10) and press annular cap 224 downward with respect to body vertical wall 220. As annular cap 224 moves downward, spike 236 begins to pierce seal 240. The consumer can continue to press annular cap 224 downward until inwardly pointing flange 226 bottoms out against base 218, which will pierce the largest hole 248 in seal 240, thereby exposing the nutritive substance layer to the contents of the container. In this arrangement, closure 214 is in its closed first position where annular cap inwardly pointed flange 226 engages a second outward extending flange 246 on body vertical wall 220, thereby retaining the cap in the closed position. While closed, the consumer may shake the contents of the container causing the contents of the container to contact the nutritive substance.

If the user pulls annular cap 224 upward, annular cap inwardly pointing flange 226 moves over flange 246 and is prevented further upward movement when it contacts vertical wall outwardly pointing flange 222. In this position, each time the consumer inverts the container, the contents of the container flow from the container through hole 248 into contact with the nutritive substance layer, which provides a gradual release of the nutritive substance during consumption of the product. Similar to the previously described embodiment, the configuration of seal 240 protects the nutritive substance from exposure to the atmosphere and the contents of the container prior to piercing of the seal, thereby extending the shelf life of the nutritive substance. In this embodiment, seal 240 provides a seal on container 212 and provides a vehicle for carrying the nutritive substance.

It should be understood that a tear band is not required in this embodiment. Any device which prevents spike 236 from contacting releasable seal 240 until just before consumption of the product may be utilized in this embodiment.

Figures 12, 13:
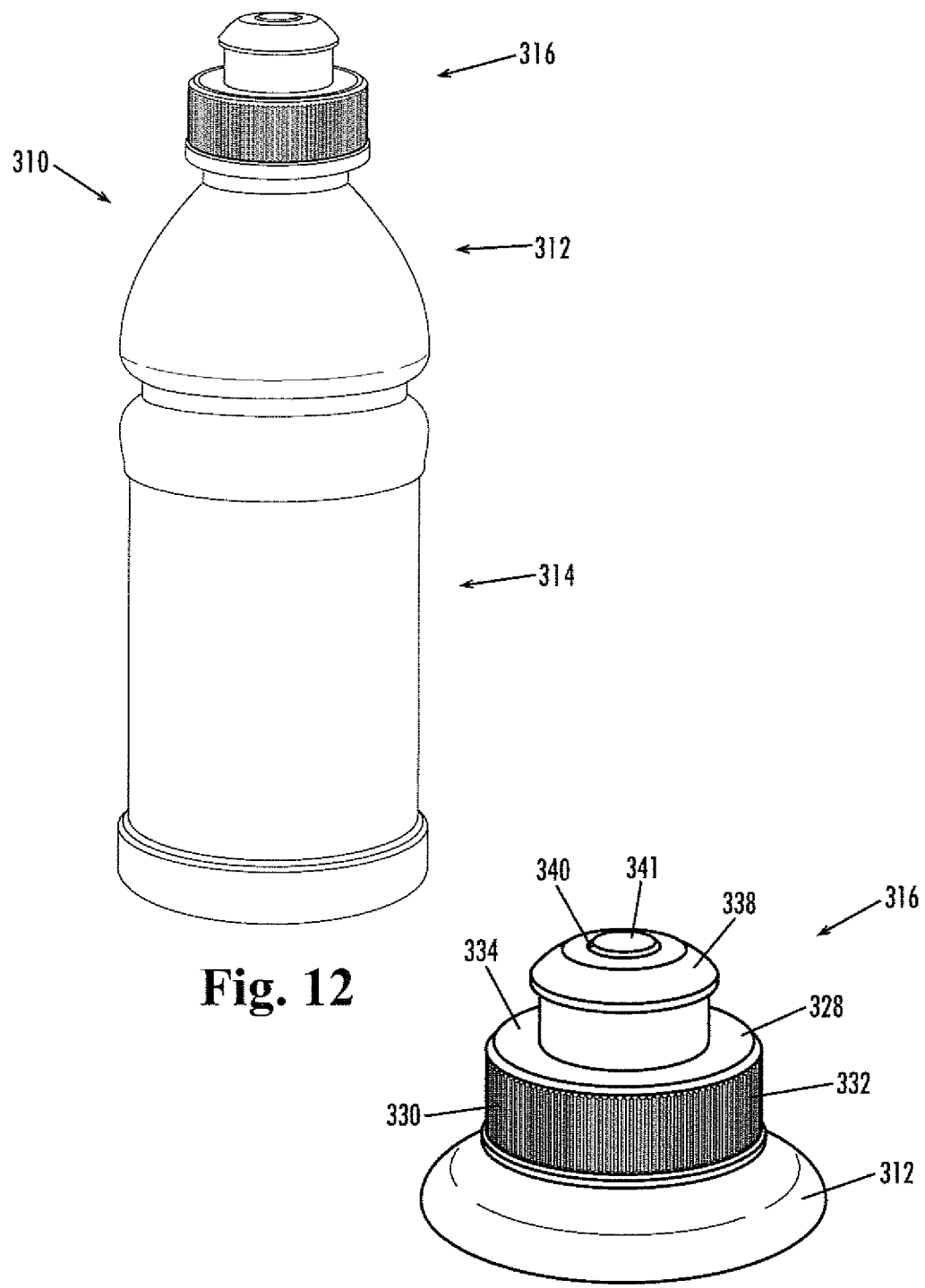
FIG. 12 is a perspective view of a container in accordance with one embodiment of the present invention.
FIG. 13 is a partial perspective view of the container top illustrated in FIG. 12.

Referring to FIGS. 12 and 13, in still yet another embodiment, a container 310 is shown having a top portion 312, a body portion 314, and a closure 316. Top portion 312 and body 314 may be integrally molded of a suitable polymer material, which may be blow molded, by extrusion or injection, so that it is a unitary member of uniform wall thickness. Suitable polymers for forming the container include, but are not limited to, polystyrene, polystyrene-acrylonitile, acrylonitile-butadiene-styrene, styrene-maleicanhydride, polycarbonate, polyethylene terephthalate, polyvinylcyclohexane, and blends thereof.

Figure 14:
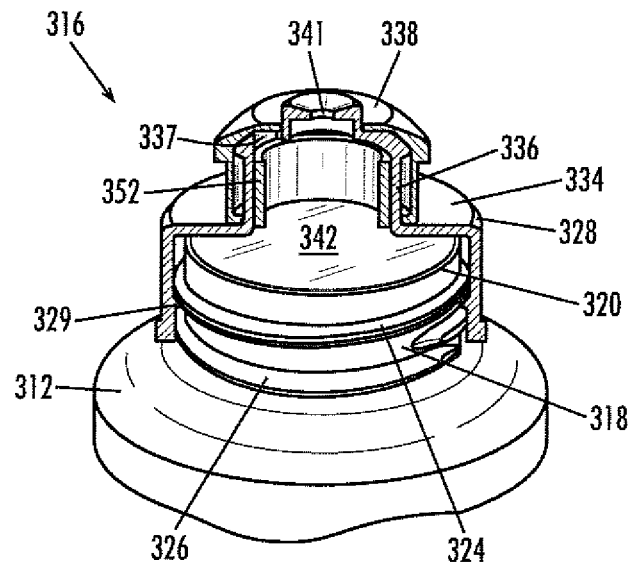
FIG. 14 is a partial perspective cut-away view of the container top illustrated in FIG. 12.

Referring to FIGS. 13 and 14, top portion 312 may include a threaded cylindrical portion 318 that defines a rim 320. Rim 320 may define an aperture 322 (FIG. 15) in fluid communication with an inner chamber (not shown) of body 314. In some embodiments, cylindrical top portion 318 is adapted for the removable receipt of closure 316 by a helical thread 324 integrally formed on threaded cylindrical portion 318. Helical thread 324 may begin proximate to rim 320 and may terminate proximate a flange 326.

Closure 316 may include an annular cap 328 having a helical thread 329 (FIG. 14) on its inner circumference for removably securing cap 328 on externally threaded cylindrical top portion 318. Outer circumference 330 of annular cap 328 may contain ribs or knurling 332 to allow the user to more easily grip closure 316 to remove it from, or fit it on, top portion 312. In addition to its internally threaded cylindrical wall, cap 328 includes an annular end wall 334 having an extension 336 defining a hole 337 (FIG. 14) therethrough. A second annular enclosure 338, having an opening 340 (FIG. 15) therein, may be operatively secured to annular end wall extension 336 so that second annular enclosure 338 is moveable between a first position where second annular enclosure 338 prevents the contents of the container from flowing through opening 340, and a second position where the contents of the container are able to flow through opening 340. Specifically, when second annular closure 338 is in the first position (FIG. 14), a top surface 341 plugs hole 340, and when in its second position (FIG. 15), top surface 341 moves out of hole 240 to allow the contents of the container to flow therethrough. It should be understood that closure 316 may be formed from any type of suitable closure known in the art.

Figure 15:
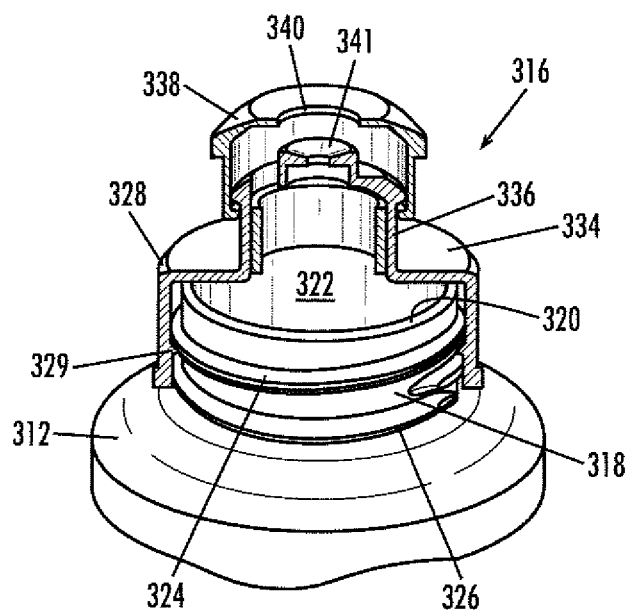
FIG. 15 is a partial perspective cut-away view of the container top illustrated in FIG. 12.

With reference to FIGS. 14 and 15, a releasable seal 342 may be attached to rim 320 over aperture 322 (FIG. 15). Releasable seal 342 may contain a pull tab (not shown) for removing the seal from rim 320. The tab may be formed from the same material as releasable seal 342 or may be formed of, or coated with, a different material to increase gripability of the tab. One skilled in the art should be familiar with such releasably attached seals and pull tabs. Removal of closure 316 will not disturb the seal unless seal 342 is cut or removed.

An insert 352, which is coated with a nutritive substance, may be press-fitted inside annular end wall extension 336 or may be secured in place by any other suitable method. In the alternative, a nutritive substance may be coated directly on the inside surface of annular end wall extension 336 or any other portion of the annular cap 328 or closure 316 that contacts the contents of the container upon consumption. In yet another embodiment, insert 352 may be secured within annular end wall extension 336 and a nutritive substance may be coated directly on the inside surface of annular wall extension 336. If utilized, insert 352 may be placed within the closure just prior to the capping procedure down stream from the filling/sealing procedure so that the nutritive substance is exposed to the atmosphere for only a limited period of time. The use of an insert may allow for standard closures to be retrofitted with the inserts without the need to redesign the closure.

In use, a consumer may remove closure 316 to reveal releasable seal 342. As the releasable seal tab is pulled away from rim 320, the tensile force applied on the bond between releasable seal 342 and rim 320 causes the bond to fail, thereby allowing the user to remove the releasable seal. In the arrangement shown in FIG. 15, insert 352 is then exposed to both the atmosphere and the product in container 314. Closure 316 may then be replaced on threaded cylindrical portion 318, thereby resealing the container. When closure 316 is replaced onto the container, each time the consumer inverts the container, the product contained therein flows from the container through aperture 322 into contact with insert 352, which provides a gradual release of the nutritive substance prior to or during consumption of the container's contents.

Figure 16:
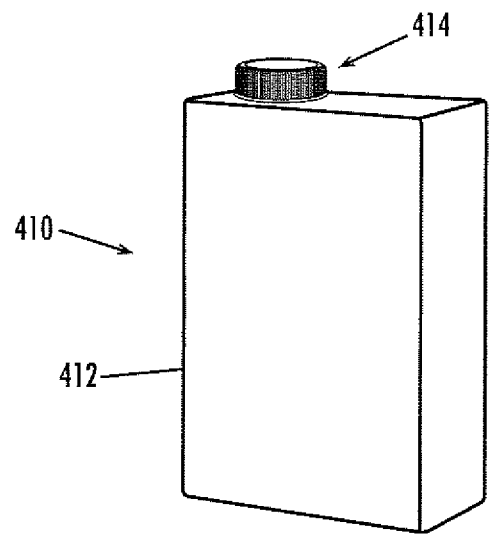
FIG. 16 is a perspective view of a container in accordance with one embodiment of the present invention.
Figure 17:
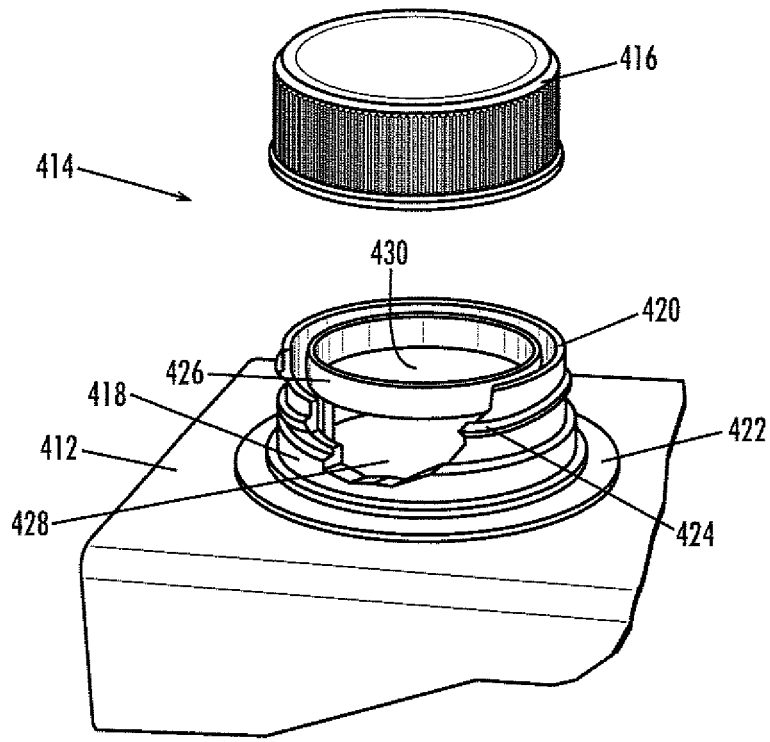
FIG. 17 is a partial perspective view of the container top illustrated in FIG. 16.
Figure 18:
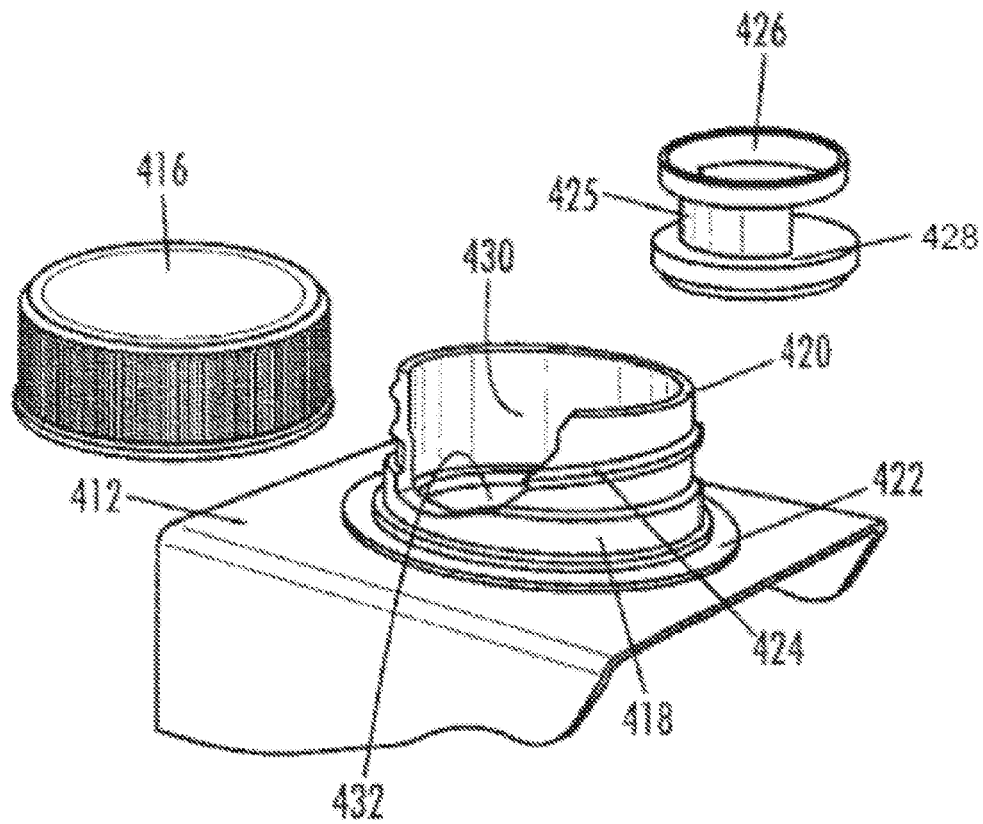
FIG. 18 is a partial perspective cut-away view of the container top illustrated in FIG. 16.

Referring to FIGS. 16 and 17, in still another embodiment, container 410 includes a generally rectangular body 412 and a closure 414. The container body in this embodiment need not be rectangular and may any suitable shape. Closure 414 may include a threaded cylindrical body 418 defining a rim 420 at one end and terminating in a base 422 at an opposite end. Rim 420 may define an aperture that extends through threaded cylindrical body 418 and that is in fluid communication with a chamber (not shown) of body 412. The aperture may be configured to releasably receive a removable seal having a pull ring 426 connected to a circular base 428 by a tab 425 (FIG. 18). Removable circular seal base 428 may seal off a through hole 432 (FIG. 18) formed in rectangular body 412, allowing the contents of container 412 to be sealed therein.

Threaded cylindrical body 418 is adapted to threadably receive a removable cover 416. An inner circumference of threaded cylindrical body 418 may be coated with a nutritive substance layer 430 on the surface above the connection of circular seal base 428 and threaded cylindrical body 418. It should be understood by those in the art that nutritive substance layer 430 may take various forms so long as the nutritive substance is maintained in place above closure circular seal base 428. Thus, an insert having a nutritive substance coating may be press fitted into the inner circumference of threaded cylindrical body 418.

Cylindrical top portion 418 and body 412 may be integrally molded of a suitable polymer material, which may be blow molded, by extrusion or injection, so that it is a unitary member of uniform wall thickness. Suitable polymers for forming the container include, but are not limited to, polystyrene, polystyrene-acrylonitile, acrylonitile-butadiene-styrene, styrene-maleicanhydride, polycarbonate, polyethylene terephthalate, polyvinylcyclohexane, and blends thereof. In the alternative, top portion 418 may be bonded to body 412 by threaded cylindrical body base 422.

Referring to FIG. 18, in use, a consumer may pull on pull ring 426, (FIG. 18) resulting in circular seal base 428 breaking away from the inner circumference of threaded top portion 418. Once ring 426 is completely removed, the contents of container 412 may be exposed to nutritive substance coating 430. The consumer may then place cap 416 onto threaded cylindrical top portion 418 so that the contents can be shaken, thereby introducing the nutritive substance to the contents of the container. Moreover, each time container 412 is tilted to pour the contents, a gradual release of nutritive substance is achieved.

In each of the above described embodiments, the nutritive substance may be any known in the art. For example, the nutritive substance may be a macronutrient, a micronutrient, a bioactive agent, a long-chain polyunsaturated fatty acid, a probiotic, a prebiotic, a vitamin, a mineral, or combinations thereof. The nutritive substance may be a substance that is sensitive to heat, light, oxygen, moisture, or any component that is contained within the container body. In an embodiment, the nutritive substance is maintained as sterile until the user desires to mix the nutritive substance and the product within the container.

In a particular embodiment, the nutritive substance is a probiotic. The probiotic may be any probiotic known in the art. In particular embodiments, the probiotic is impregnated into a gum substrate. The gum substrate may, in some embodiments, comprise plant starches, instant hydratable starches, pregelatinized starches, instantized cold soluble starches, disintegratable starches, immobilized food-grade resins, or low-melting fats impregnated with disintegrating starches. In a particular embodiment, the gum substrate may comprise a low-melting fat impregnated with a disintegrating starch, which on contact with water can swell and release the probiotic. In another embodiment, the gum substrate may comprise an immobilized food-grade resin, which can be used to adsorb the probiotic. Upon contact with water, the immobilized food grade resin readily dislodges the probiotic. In particular embodiments, hydrophilic substances, such as emulsifiers, can be included in the gum substrate to assist in the release of the probiotic upon contact of the probiotic with the product.

In another embodiment, the probiotic may be applied as a powder that is suspended in an oil- or wax-based suspension. Any oil or wax known in the art may be utilized in this embodiment, provided it does not adversely affect the properties of the container or the contents of the container.

In at least one embodiment, the probiotic may be *Lactobacillus rhamnosus* GG. In another embodiment, the probiotic may be *Bifidobacterium* BB-12. In a particular embodiment, the probiotic may be a combination of *Lactobacillus rhamnosus* GG and *Bifidobacterium* BB-12. In some embodiments, the level of probiotic present is within the range of about $1\times10^5$ colony forming units (cfu) per gram formula to about $1\times10^{10}$ cfu per gram formula. In other embodiments, the level of probiotic present is within the range of about $1\times10^6$ colony forming units (cfu) per gram formula to about $1\times10^9$ cfu per gram formula. In some embodiments, the level of probiotic present is within the range of about $1\times10^6$ colony forming units (cfu) per gram formula to about $1\times10^8$ cfu per gram formula.

Because many probiotics are sensitive to heat and may be damaged or killed if subjected to the heat treatment that is necessary for many food and drink products, the present invention provides the compartmentalized storage of a probiotic. In the present invention, the product contained within the container may undergo heat treatment or sterilization during the packaging process. After the product has been packaged into a container and sterilized, a seal containing a probiotic layer may be affixed to the container. Alternatively, the probiotic may be contained on an insert as described herein or may be coated within the upper portion of the container or the container closure. The package may then be prepared for shipment or display. In these configurations, the probiotic is not subjected to damaging heat treatment during packaging and is kept separate from the product itself until consumption, at which time the two can be intermixed.

Thus, in some embodiments, the invention comprises a method for making a delivery apparatus comprising a) providing a container as described herein; b) filling the container with a product; c) sterilizing the product-filled container; d) sealing the container with a laminate seal as described herein; and e) placing a closure on the container.

The product contained within the container may be any product known in the art. In some embodiments, the product is in a form selected from a liquid, ready-to-use product, liquid concentrate, fluid, powder, suspension, emulsion, or combination thereof. In some embodiments, the product contained within the container is a food or drink product. In a particular embodiment, the product contained within the container is a nutritional supplement for children or adults.

While the container itself may be constructed from a polymer such as polystyrene, polystyrene-acrylonitile, acrylonitile-butadiene-styrene, styrene-maleicanhydride, polycarbonate, polyethylene terephthalate, polyvinylcyclohexane, and blends thereof, the container may also be constructed from paper, cardboard, or another fibrous material, optionally coated with a plastic material or foil laminate. Similarly, the container could be constructed from a flexible film, thereby providing a flexible pouch.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole and in part. Furthermore, those of ordinary skill in the art will appreciate that the foregoing description is by way of example only, and is not intended to limit the invention so further described in such appended claims. Therefore, the spirit and scope of the appended claims should not be limited to the description of the preferred versions contained therein.

What is claimed is:

1. An apparatus for delivering a nutritive substance comprising:
   a. a container body having
      (i) a base at one end thereof,
      (ii) an upper portion adapted for removable receipt of a closure, said upper portion defining an opening therein, and
      (iii) a chamber defined by said container body, said chamber being in fluid communication with said upper portion opening,
   b. a seal bonded across said upper portion opening and adapted to provide an airtight seal across said opening;
   c. a closure removably coupled to said upper portion; and
   d. a nutritive substance bonded to an inner surface of said container upper portion, wherein said seal prevents contact between said nutritive substance and the contents of said container until said seal is removed or pierced.

2. The apparatus of claim 1, said closure further comprising an annular cap having a vertical side wall and a top surface coupled to said side wall, wherein said top surface is adapted to allow the contents of said container to pass therethrough.

3. The apparatus of claim 2, wherein said nutritive substance is bonded to said container upper potion inner circumference.

4. The apparatus of claim 1, said seal further comprising a tab coupled to said seal, wherein said tab assists a user in removing said seal from said container.

5. The apparatus of claim 1, said seal further comprising;
   a. a circular seal base removably coupled to an inside wall defined by said container upper portion; and
   b. a ring connected to said circular seal base by a tab.

6. The apparatus of claim 5, wherein when said ring is pulled away from said container upper portion, said circular seal base breaks away from said upper portion inside wall, thereby allowing the contents of said container to contact said nutritive substance.

7. The apparatus of claim 1, wherein said nutritive substance comprises a probiotic.

8. The apparatus of claim 7, wherein the probiotic is bonded to said inner surface of said container upper portion as an oil-based suspension of probiotic powder.

9. The apparatus of claim 7, wherein the probiotic is bonded to said inner surface of said container upper portion as a wax-based suspension of probiotic powder.

10. The apparatus of claim 7, wherein the probiotic comprises *Lactobacillus rhamnosus* GG.

* * * * *